United States Patent [19]

Tamura et al.

[11] Patent Number: 5,371,540
[45] Date of Patent: Dec. 6, 1994

[54] DIGITAL-SIGNAL-PROCESSING CAMERA

[75] Inventors: Akihiro Tamura, Yawata; Atsushi Morimura, Nara; Yoshinori Kitamura, Takatsuki, all of Japan

[73] Assignee: Matsushita Electric Industrial Co., Osaka, Japan

[21] Appl. No.: 133,786

[22] Filed: Oct. 8, 1993

Related U.S. Application Data

[63] Continuation of Ser. No. 793,442, filed as PCT/JP 91/00516, Apr. 18, 1991, published as WO 91/16789, Oct. 31, 1991, abandoned.

[30] Foreign Application Priority Data

Apr. 19, 1990 [JP] Japan ................. 2-103455

[51] Int. Cl.$^5$ .............................................. H04N 5/14
[52] U.S. Cl. .................................... 348/222; 348/518; 348/914
[58] Field of Search ............... 358/160, 21 R, 213.11, 358/213.13, 213.15, 213.17, 213.18, 163; 348/222, 518, 914; H04N 5/14, 5/067, 3/14

[56] References Cited

U.S. PATENT DOCUMENTS

| | | | |
|---|---|---|---|
| 3,987,243 | 10/1976 | Schwartz | 358/160 |
| 4,670,790 | 6/1987 | Sawada et al. | 358/160 |
| 4,803,553 | 2/1989 | Schrock et al. | 358/149 |
| 4,858,013 | 8/1989 | Matsuda | 358/213.17 |

FOREIGN PATENT DOCUMENTS

| | | |
|---|---|---|
| 2508262 | 12/1982 | France . |
| 0030369 | 3/1981 | Japan . |
| 0038076 | 3/1983 | Japan . |
| 0085673 | 5/1983 | Japan . |
| 0275211 | 11/1987 | Japan . |
| 0232579 | 9/1988 | Japan . |
| 0007772 | 1/1989 | Japan . |
| 0011482 | 1/1989 | Japan ......................... H04N 5/335 |
| 065558 | 3/1989 | Japan . |
| 0120961 | 5/1991 | Japan ......................... H04N 5/140 |
| 0287573 | 10/1992 | Japan ......................... H04N 5/14 |
| 2155273 | 9/1985 | United Kingdom . |

*Primary Examiner*—David E. Harvey
*Attorney, Agent, or Firm*—Cushman, Darby & Cushman

[57] ABSTRACT

In the present invention, a drive circuit 12 drives a solid-state image-pickup element 11 in synchronism with a synchronizing signal generated by a synchronizing signal generation circuit 13, and the solid-state image-pickup element 11 issues an output signal prior to an end time of a horizontal blanking period by a time period $T_A$. This output signal is processed in a digital signal processing circuit 14 and is issued as a picture signal. At that time, the picture signal is delayed from the synchronizing signal by a time period ($T_B$-$T_A$) owing to the signal processing, whereas the synchronizing signal is delayed by a delay circuit 15, in which a delay time made by subtracting a time period $T_A$ from a delay time $T_B$ of the digital signal processing circuit 14 is given, and can be issued in a proper timing for a picture signal output of the digital signal processing circuit 14. Further, by incorporating the delay circuit 15 in an LSI which constitutes the digital signal processing circuit 14, a circuit-construction can be minimized and a disturbance, which is given to the picture signal by the synchronizing signal, can be remarkably eliminated.

3 Claims, 7 Drawing Sheets

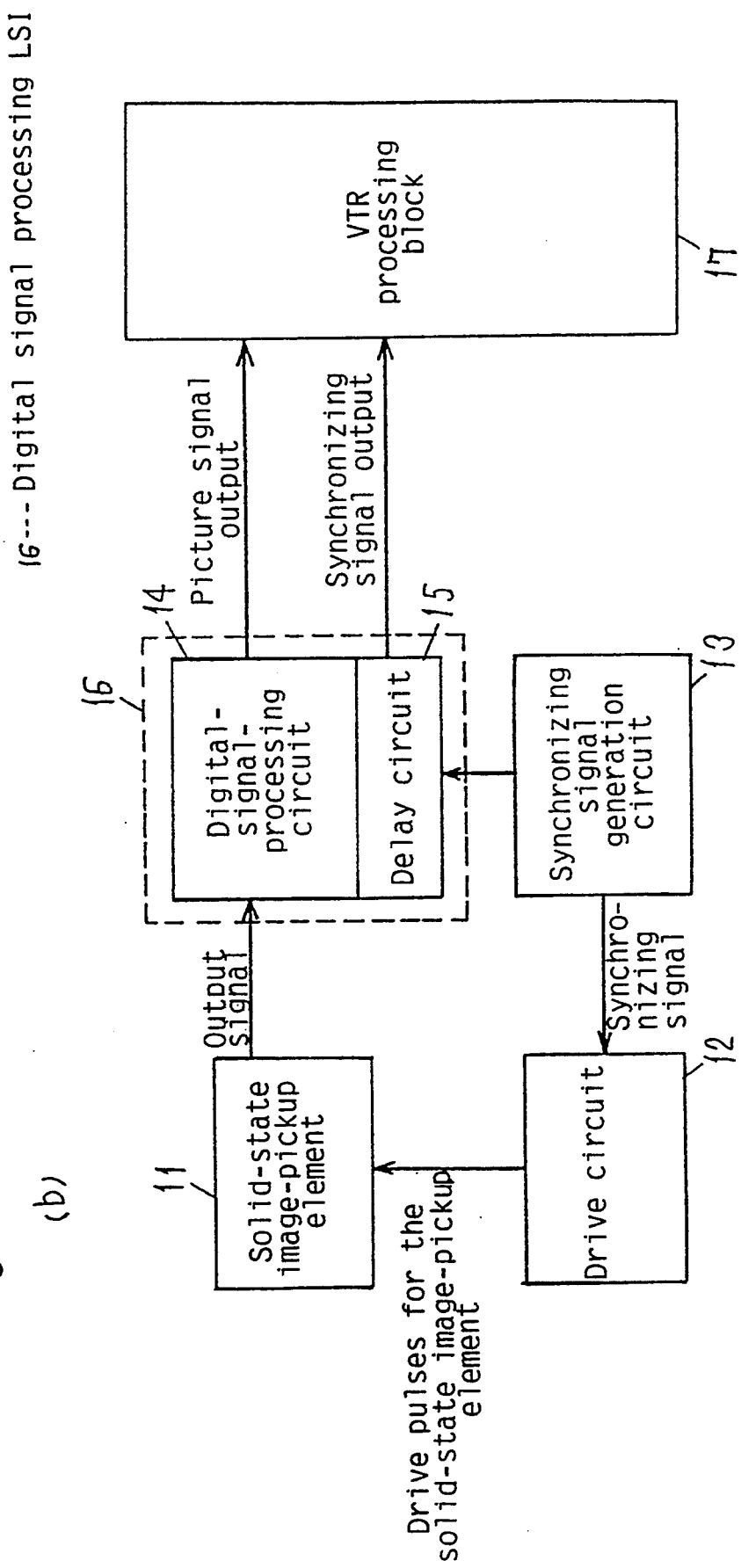

61---Delay element
62---Multiplier
63---Adder

DIGITAL-SIGNAL-PROCESSING CAMERA

This is a continuation of application Ser. No. 07/793,442, filed as PCT/JP 91/00516, Apr. 18, 1991, published as WO 91/16789, Oct. 31, 1991, now abandoned.

BACKGROUND OF THE INVENTION

1. Field of the Invention

The present invention relates to a signal processing part of a digital-signal-processing camera.

2. Discussion of the Prior Art

In recent years, many digital-signal-processing cameras have been developed. Hereinafter, an example of the above-mentioned conventional digital-signal-processing camera is described with reference to the drawings.

FIG. 7 is a block diagram showing a construction of the conventional digital-signal-processing camera. In FIG. 7, numeral 51 designates a solid-state image-pickup element; numeral 52 designates a drive circuit which drives the solid-state image-pickup element 51 so that the solid-state image-pickup element 51 can issue an output signal prior to an end time of horizontal blanking period by a time period $T_A$ (approx. 1 $\mu$sec) within a horizontal blanking period; numeral 53 designates a synchronizing signal generation circuit which generates a synchronizing signal; numeral 54 designates a digital-signal-processing circuit which processes output signals of the solid-state image-pickup element 51; numeral 55 designates a picture signal output of the digital-signal-processing circuit 54; numeral 56 designates a synchronizing signal which is generated by the synchronizing signal generation circuit 53.

FIG. 6 shows a construction of a digital filter in the digital-signal-processing circuit. Numeral 61 designates delay elements; numeral 62 designates multipliers; numeral 63 designates an adder.

Operation of the conventional digital-signal-processing camera as constructed above is described hereafter.

First, having a synchronism with the synchronizing signal 56 generated by the synchronizing signal generation circuit 53, the drive circuit 52 generates drive pulses for solid-state image-pickup element to drive the solid-state image-pickup element 51, so that the solid-state image-pickup element 51 issues an output signal prior to an end time of horizontal blanking period by a time period $T_A$ (approx. 1 $\mu$sec) within a horizontal blanking period. The digital-signal-processing circuit 54 makes signal processings such as low-pass filter, edge-emphasizing filter and noise reduction filter on the output signal issued from the solid-state image-pickup element 51, and issues as the picture signal 55. Further, the synchronizing signal 56, which has been generated in the synchronizing signal generation circuit 53, is issued together with the picture signal. The digital signal-processing circuit 54 is thus composed of several digital filters. As shown in FIG. 6 (e.g., "Digital Filter" of the seventh chapter of "Digital-signal-processing of picture" by Takahiko FUKINUKI, published by NIKKAN KOGYO SHINBUNSHA), a digital filter is composed of the delay elements 61, the multipliers 62 and the adder 63.

According to such a construction as this, an input signal is delayed through the delay elements 61 of M steps, and turns into an output signal. For example, to have total 100 steps delay elements of the digital filter in the digital-signal-processing circuit with an operation of a clock of 10 MHz is to issue a picture output signal with a delay time of $T_B$(10 $\mu$sec). Therefore, the picture output signal shall be delayed by a time (approx. 9 $\mu$sec) of ($T_B$-$T_A$) from the horizontal blanking period.

In the above-mentioned construction, the conventional analogue-signal-processing has a delay time of only about 1 $\mu$sec and hence delay of a picture signal, which is within the horizontal blanking period, causes no trouble; whereas the digital-signal-processing circuit consists of the digital adder and multiplier and the delay elements, and the digital-signal-processing realized by the whole 100 steps of delay elements generates a delay time of about 10 $\mu$sec even when it is driven by a clock of 10 MHz. FIG. 3 is a signal chart of the digital-signal-processing camera, wherein there is a problem that the horizontal blanking signal A and the picture signal D are overlapped each other as shown in FIG. 3. Further, when it is intended that the horizontal synchronizing signal B and the horizontal blanking signal A are made to have a delay time of about 10 $\mu$sec, which arises in the digital-signal-processing circuit, by the solid-state image-pickup element and the drive circuit so as to timely match the horizontal synchronizing signal F and the horizontal blanking signal E with the picture signal D, there arises no problem in the horizontal blanking signal E because it is not used to drive the solid-state image-pickup element and is therefore disposed away from the solid-state image-pickup element and the drive circuit so as not to give a disturbance; but the horizontal synchronizing signal F, which is used to drive the solid-state image-pickup element, gives a disturbance to the output signal C of the solid-state image-pickup element, disabling use of the picture signal.

SUMMARY OF THE INVENTION

In view of the above-mentioned problems, an object of the present invention is to offer a digital-signal-processing camera and a digital-signal-processing LSI which gives no disturbance to a picture signal and can issue a picture signal and a synchronizing signal in a proper timing.

In order to achieve the above-mentioned object, the digital-signal-processing camera of the present invention comprises: a synchronizing signal generation circuit which generates a synchronizing signal; a solid-state image-pickup element; a drive circuit which drives the aforementioned solid-state image-pickup element to let the aforementioned solid-state image-pickup element issue an output signal prior to an end time of a horizontal blanking period by a time period of $T_A$, within the horizontal blanking period; a signal processing circuit which processes an output signal issued from the aforementioned solid-state image-pickup element; and a delay circuit which delays the aforementioned synchronizing signal by a time period which is made by subtracting the aforementioned time period $T_A$ from a delay time $T_B$ of the aforementioned signal processing circuit.

According to the above-mentioned construction of the present invention, the drive circuit drives the solid-state image-pickup element in synchronism with a synchronizing signal generated by the synchronizing signal generation circuit, and thereby the solid-state image-pickup element issues an output signal prior to an end time of the horizontal blanking period by a time period of $T_A$. This output signal is processed by the signal processing circuit and is issued as a picture signal. At this time the picture signal lags from the synchronizing signal by a time period of ($T_B$-$T_A$) owing to processing the signal; and the synchronizing signal generated in the synchronizing signal generation circuit is delayed by the delay circuit which makes delay of time period made by subtracting the aforementioned time period $T_A$ from the delay time $T_B$ of the aforementioned signal processing circuit, thereby enabling issuance in a proper timing for the picture signal output of the signal processing circuit. Further, it is possible to make a circuit construction small by incorporating the delay circuit in an LSI which constitutes the signal processing circuit, so that it is possible to remarkably eliminate a disturbance of the synchronizing signal which is given to the picture signal.

Hereupon, although description is made simply about the synchronizing signal, this means to be directed not only to the synchronizing signal in a narrow sense, but also can be obviously directed to the synchronizing pulse signal in a broad sense which includes a blanking signal, clamp pulses or a color burst etc. as well as the horizontal synchronizing signal and the vertical synchronizing signal.

Further, though the description of operation has been made by setting up the time-period $T_A$, it is possible to make the time-period $T_A$ zero. At this time, a delay time of the delay circuit coincides with the delay time $T_B$ of the signal processing circuit.

Hereupon, in the description of operation, a delay time of the delay circuit has been made a time period of $(T_B-T_A)$, but it may be a delay time defined by subtracting the time period $T_A$ from a delay time, which is capable of canceling a delay of an external delay circuit (for example, a delay of an analogue circuit such as a digital-analogue conversion circuit or a low-pass filter etc.), in view of the whole system.

Moreover, in a construction of the present invention, although description was made only about one delay circuit, it is possible to provide plural delay circuits in proportion to a necessary number of the synchronizing signals.

DETAILED DESCRIPTION OF THE PREFERRED EMBODIMENTS

Figure 1:
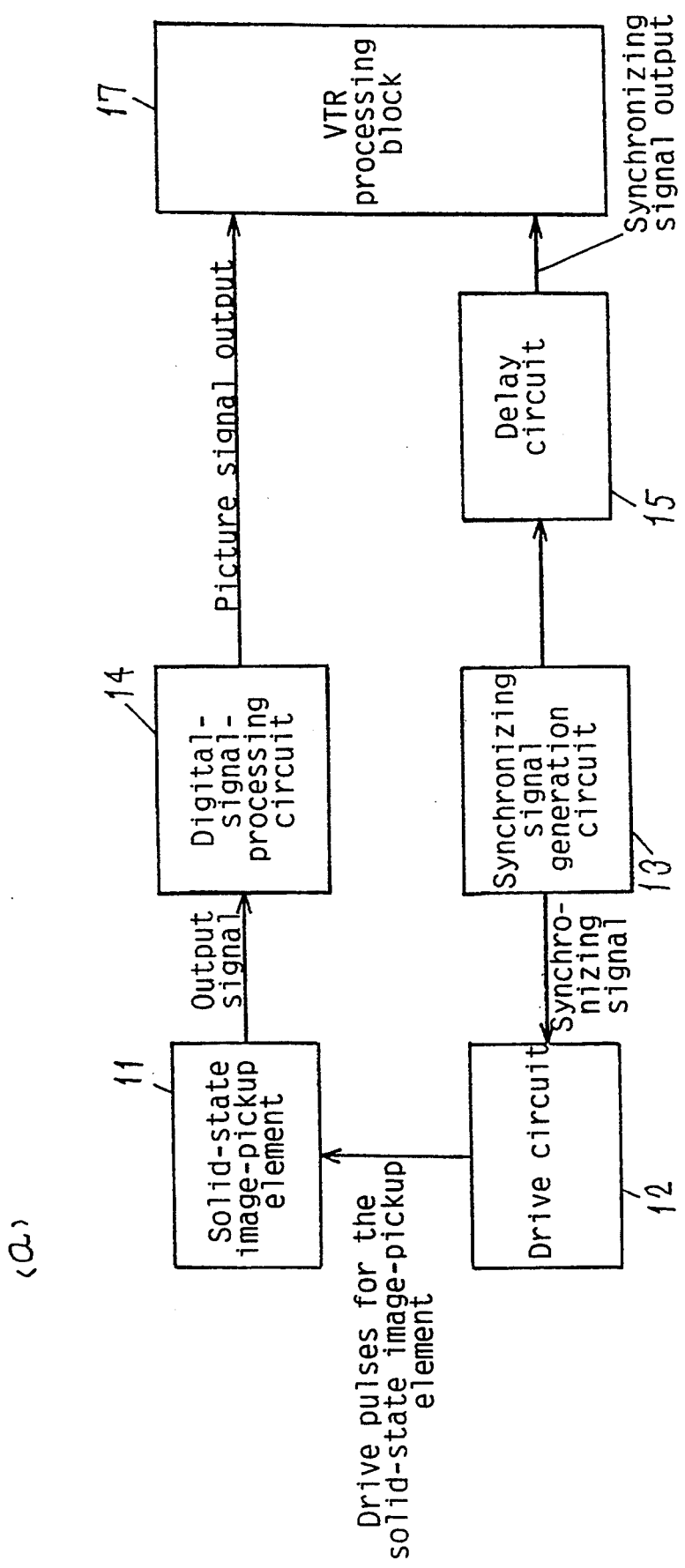
FIGS. 1(a) and 1(b) are block diagrams showing a construction of a digital-signal-processing camera in a first embodiment of the present invention.

Hereafter, a digital-signal-processing camera of an embodiment of the present invention is described with reference to the drawings. FIG. 1(a) and FIG. 1(b) are block diagrams showing a construction of a digital-signal-processing camera in the first embodiment of the present invention. In FIGS. 1(a) and 1(b), numeral 11 designates a solid-state image-pickup element, numeral 12 designates a drive circuit which drives the solid-state image-pickup element 11 so that the solid-state image-pickup element 11 can issue an output signal prior to an end time of horizontal blanking period by a time period $T_A$ (approx. 1 μsec) within a horizontal blanking period; numeral 13 designates a synchronizing signal generation circuit which generates a synchronizing signal; numeral 14 designates a digital-signal-processing circuit which processes output signals of the solid-state image-pickup element 11; numeral 15 designates a delay circuit in which the synchronizing signal is delayed by a time period defined by subtracting the time period $T_A$ (approx. 1 μsec) from a delay time $T_B$ of the digital-signal-processing circuit 14; numeral 16 designates a digital-signal-processing LSI. Numeral 17 designates a VTR-processing block.

Figure 2:
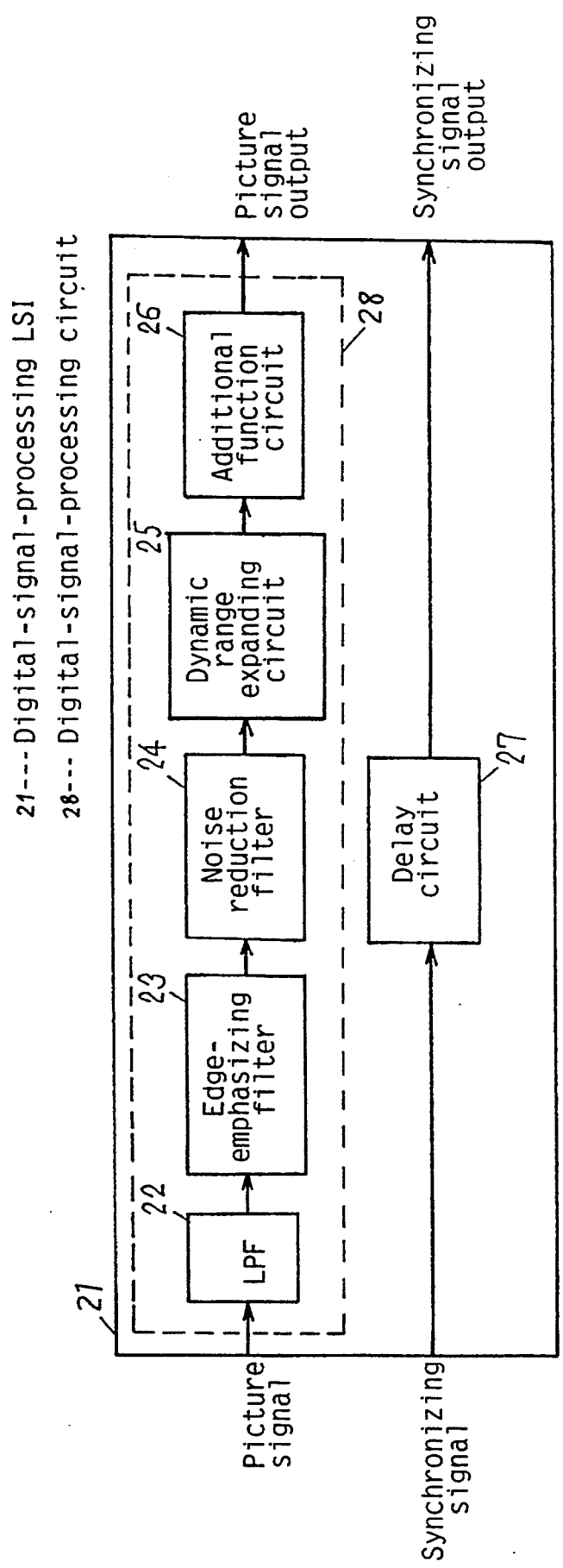
FIG. 2 is a block diagram showing a construction of a digital-signal-processing LSI in the same embodiment as mentioned above.

FIG. 2 is an example of construction for a digital-signal-processing LSI of an embodiment of the present invention. In FIG. 2, numeral 21 designates a digital-signal-processing LSI; numeral 22 designates an LPF (Low Pass Filter); numeral 23 designates an edge-emphasizing filter; numeral 24 designates a noise reduction filter; numeral 25 designates a dynamic-range-expanding circuit; numeral 26 designates an additional function circuit; numeral 27 designates a delay circuit; numeral 28 designates a digital-signal-processing circuit.

Figure 3:
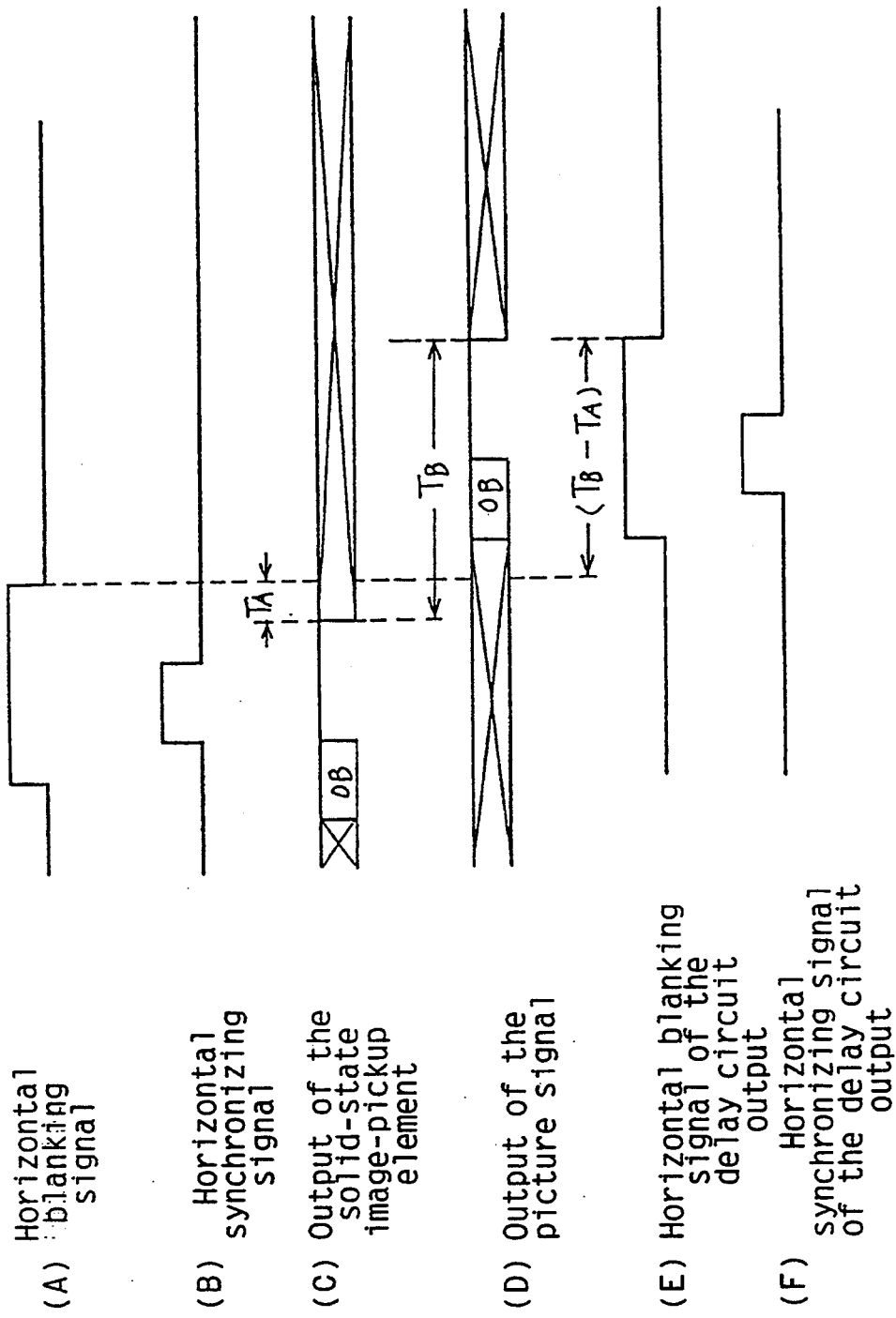
FIGS. 3(a)–(f) is a signal chart of the digital-signal-processing camera in the same embodiment as mentioned above.

FIG. 3 is a signal chart of the digital-signal-processing camera in an embodiment of the present invention. In FIG. 3, letter A designates a horizontal blanking signal; letter B designates a horizontal synchronizing signal; letter C designates an output signal of the solid-state image-pickup element; letter D designates an output of a picture signal; letter E designates a horizontal blanking signal of an output of the delay circuit; letter F designates a horizontal synchronizing signal of an output of the delay circuit.

Figure 4:
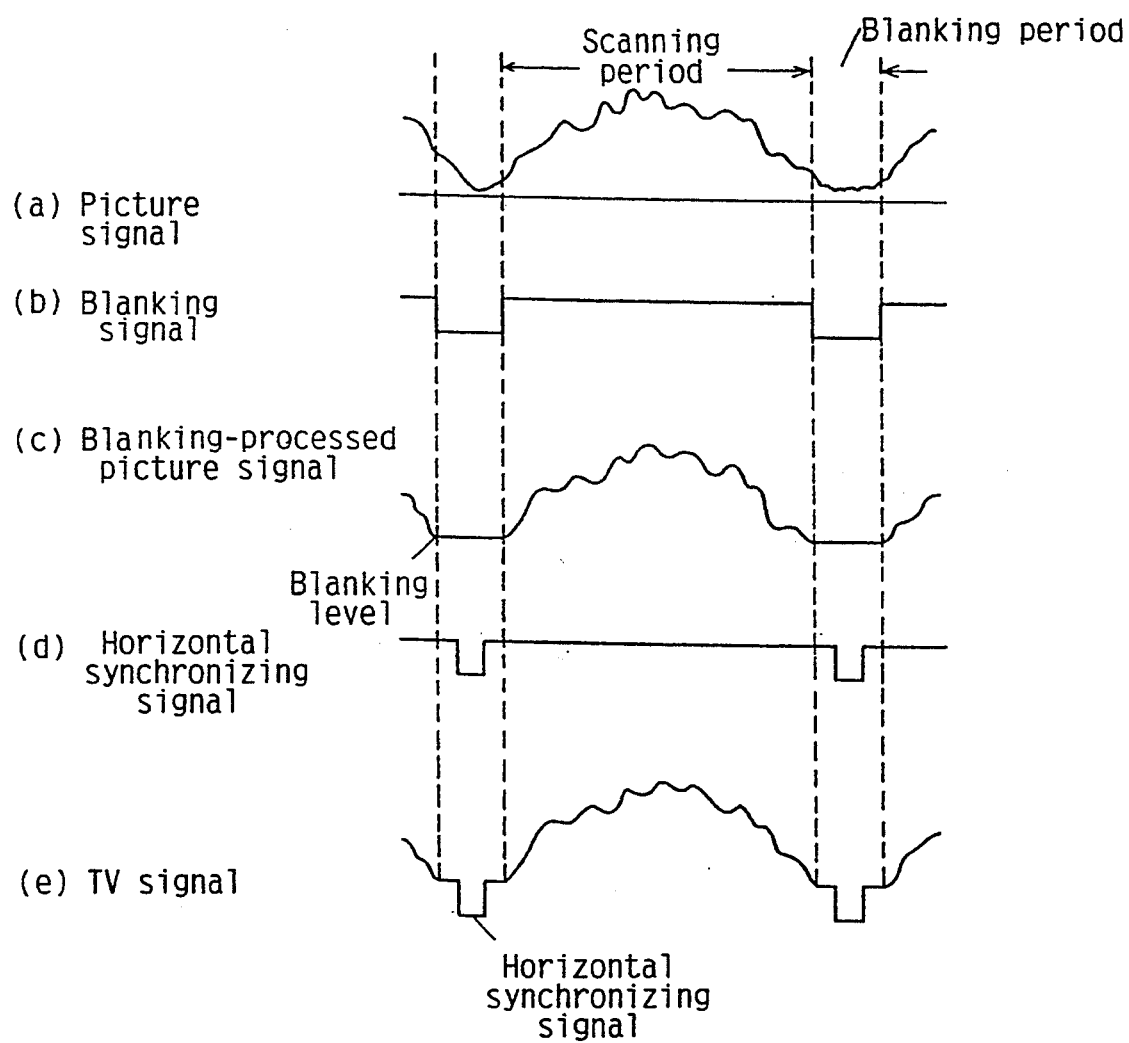
FIGS. 4(a)–(c) is a signal chart showing a sequence for making TV signals based on a picture signal, a horizontal blanking signal and a horizontal synchronizing signal, in a VTR-processing-block 17 of the same embodiment as mentioned above.

FIG. 4 is a signal chart showing a sequence for making TV signals from the picture signal and the horizontal blanking signal, in the VTR-processing block 17 of the embodiment of the present invention. In FIG. 4, letter "a" designates the picture signal; letter "b" designates the horizontal blanking signal; letter "c" designates the picture signal which has been blanking-processed; letter "d" designates the horizontal synchronizing signal; letter "e" designates the TV signals.

Operation of the digital-signal-processing camera as constructed above is described hereafter with reference to FIGS. 1, 2, 3 and 4.

First, FIG. 1(a) shows an example of construction for the digital-signal-processing camera of an embodiment of the present invention, and drive pulses for the solid-state image-pickup element 11 are generated by the drive circuit 12 in synchronism with the synchronizing signal generated by the synchronizing signal generation circuit 13, thereby operating the solid-state image-pickup element 11. The solid-state image-pickup element 11 issues an output signal prior to an end time of a horizontal blanking period by a time period $T_A$ (approx. 1 μsec), within the horizontal blanking period. The output signal, which is from the solid-state image-pickup element 11, is processed in the digital-signal-processing circuit 14 and is issued as a picture signal. At this time, although the picture signal has a delay of time period $T_B$ (approx. 10 μsec) due to digital-signal-processing, the synchronizing signal generated by the synchronizing signal generation circuit 13 is delayed by the delay circuit 15, which has a delay time of a time period $(T_B-T_A)$ (approx. 9 μsec), and is issued in a proper timing for the picture signal.

Further, as shown in FIG. 1(b), since a delay time of the delay circuit for the digital-signal-processing circuit 14 can be determined beforehand, it is possible to incorporate the delay circuit 15 in the digital-signal-processing LSI 16 which is in the same chip as the digital signal processing circuit 14. By making such an LSI construction as this, a circuit-construction of the camera can be minimized, and a disturbance, which is given to the picture signal by the synchronizing signal, can be remarkably eliminated.

Figure 6:
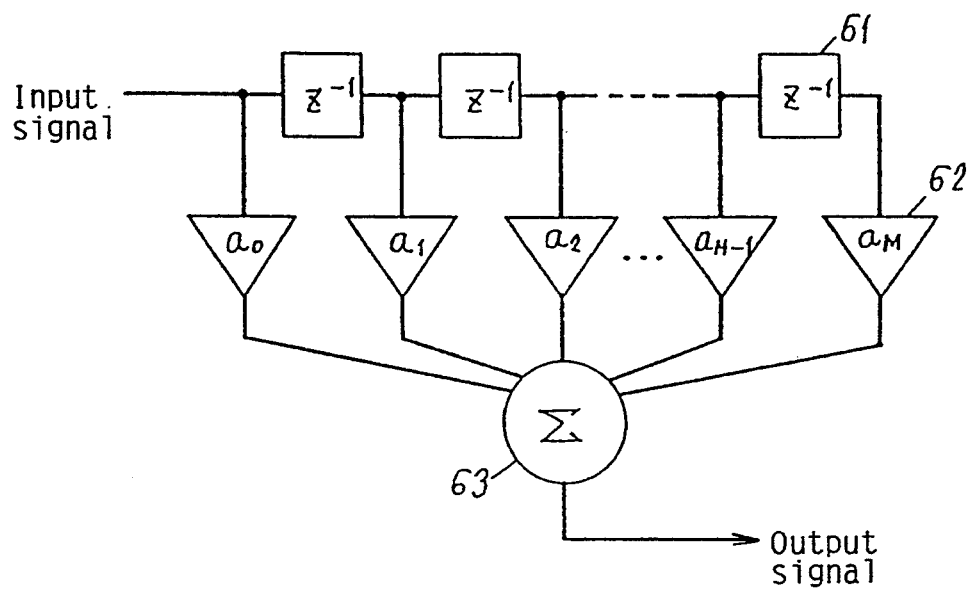
FIG. 6 is a constructional view of a digital filter of the digital-signal-processing circuit.
Figure 7:
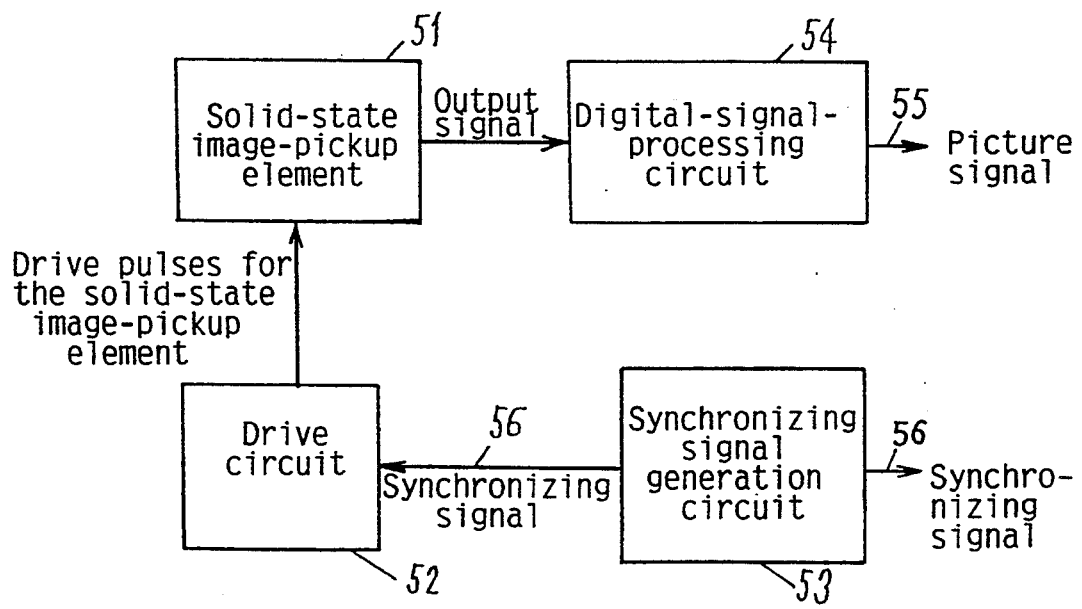
FIG. 7 is a block diagram showing a construction of the conventional digital-signal-processing camera.

Next, FIG. 2 shows an example of construction for the digital-signal-processing LSI in accordance with an embodiment of the present invention, and FIG. 3 is a signal chart of the digital-signal-processing camera in an embodiment of the present invention. Herein, the synchronizing signal in this embodiment is defined as a horizontal blanking signal and a horizontal synchronizing signal. In the digital-signal-processing LSI 21, signal processings such as the low-pass filter 22, the edge-emphasizing filter 23 and the noise reduction filter 24 are carried out for an output signal C of the solid-state image-pickup element, and a picture signal output D is issued. The digital-signal-processing circuit is thus composed of several digital filters. As shown in FIG. 6, the digital filter is composed of delay elements 61, multipliers 62 and an adder 63. In such a construction as this, the output signal C of the solid-state image-pickup element is delayed by the delay element 61 of M steps and is thereby changed into the picture signal D. For example, in case where a total step number of the delay element of the digital filter in the digital-signal-processing circuit is 100, and when it is operated by a clock of 13.5 MHz which is a sampling frequency of the picture signal, it makes a state that the picture signal output D is issued with a delay time of approximately 7.4 μsec (the time period $T_B$). At this time the horizontal blanking signal A and the picture signal output D are overlapped with each other, but, the horizontal synchronizing signal B and the horizontal blanking signal A are delayed by the delay circuit 27 which has a delay time (delay elements of approx. 86 steps) of $(T_B-T_A)$ (approx. 6.4 μsec), and issued in a proper timing for the picture signal output D of the digital-signal-processing circuit 28. After that, the picture signal and synchronizing signal are inputted to the VTR-processing block 17.

Next, FIG. 4 is a signal chart showing a sequence for making TV signals from the picture signal, the horizontal blanking signal and the horizontal synchronizing signal at the VTR-processing block 17 in an embodiment of the present invention. Herein, the synchronizing signal of this embodiment is defined as the horizontal blanking signal and the horizontal synchronizing signal. Letter (a) designates the picture signal output of the digital-signal-processing camera, and an amplitude of the output signal changes in response to brightness of a subject, but, the picture signal during the blanking period has no significance in picture reproduction. Therefore, this part is removed by the horizontal blanking signal (b), and the picture signal which has been blanking-processed as shown by (c) is obtained. Next, by adding the horizontal synchronizing signal (d) to the picture signal within the horizontal blanking period, the TV signal as shown by (e) is obtained. After making such TV signal (e), the VTR-processing is carried out. If the picture signal and the blanking signal are shifted from each other, the picture signal of a scanning period will be deleted. Therefore, the picture signal, the horizontal blanking signal and the horizontal synchronizing signal are to be issued from the digital-signal-processing camera in a proper timing.

According to this embodiment as has been stated above, the picture signal output and the synchronizing signal of the digital-signal-processing circuit can be issued in a proper timing without disturbing the picture signal, as a result of employing a construction for the digital-signal-processing camera comprising a synchronizing signal generation circuit which generates a synchronizing signal etc., a solid-state image-pickup element, a drive circuit for driving the aforementioned solid-state image-pickup element in a manner that an output signal of the aforementioned solid-state image-pickup element is issued prior to an end time of horizontal blanking period by a time period of $T_A$ within a horizontal blanking period, a digital-signal-processing circuit for processing an output signal issued from the aforementioned solid-state image-pickup element, and a delay circuit for delaying the aforementioned synchronizing signal by a time period which is subtracted from a delay time $T_B$ of the aforementioned digital-signal-processing circuit by the aforementioned time period $T_A$. Furthermore, by incorporating the delay circuit in an LSI which is the chip identical with the digital-signal-processing circuit, a circuit construction can be minimized, and a disturbance, which is given to the picture signal by the synchronizing signal, is remarkably eliminated.

Hereafter, the second embodiment of the present invention is described with reference to the drawings.

Figure 5:
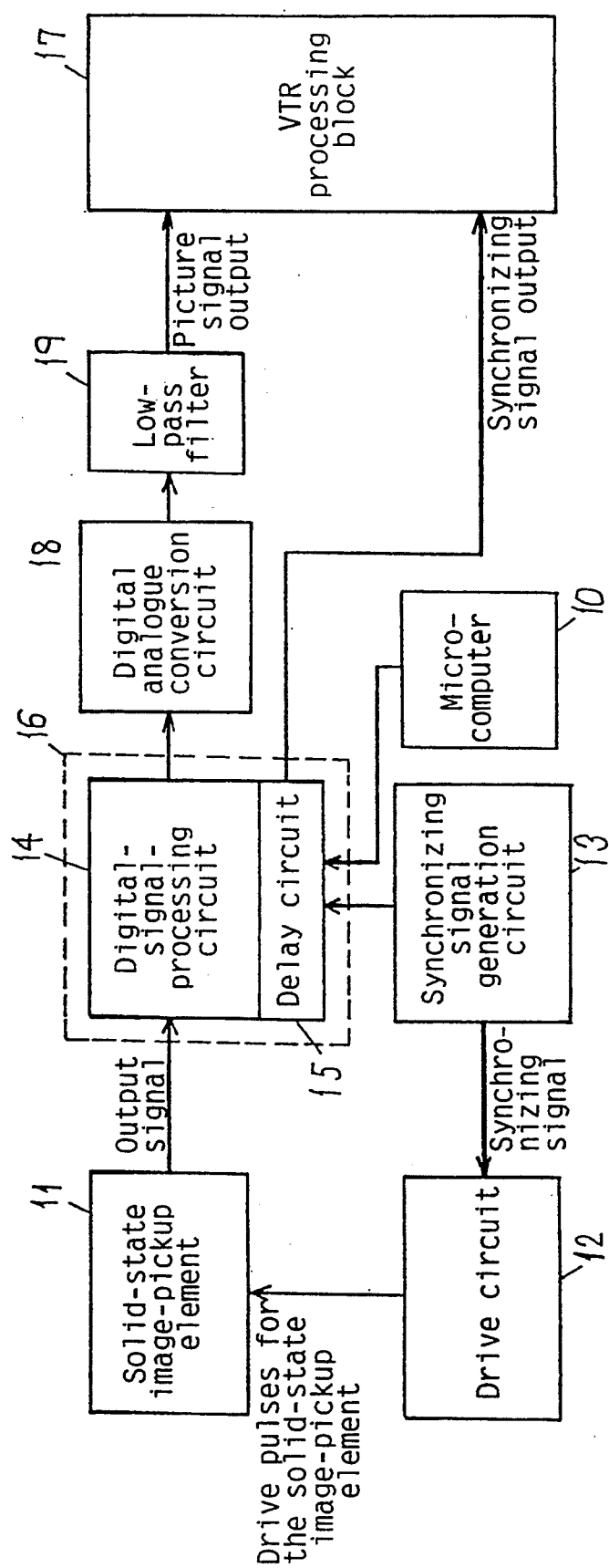
FIG. 5 is a block diagram showing a construction of the digital-signal-processing camera using the digital-signal-processing LSI, in accordance with the second embodiment of the present invention.

FIG. 5 is a block diagram showing the digital-signal-processing camera of the second embodiment of the present invention in which a digital-signal-processing LSI is used. In FIG. 5, numeral 11 designates the solid-state image-pickup element; numeral 13 designates the synchronizing signal generation circuit; numeral 14 designates a digital-signal-processing circuit; numeral 16 designates the digital-signal-processing LSI; numeral 17 designates the VTR-processing block; and the above-mentioned is a similar construction to that of FIG. 1(b). Differences from the construction of FIG. 1(b) are: a point that a delay time of the delay circuit 15 in the digital-signal-processing LSI 16 is made changeable by providing a microcomputer 10; a point that the drive circuit 12 drives the solid-state image-pickup element 11 so that an output signal thereof is issued in synchronism with the synchronizing signal; and a point that a digital-analogue conversion circuit 18 and a low-pass filter 19 are added and a delay time of the delay circuit 15 is made nearly equal to a total delay time of the digital-signal-processing circuit 14 and the analogue-signal-processing circuit (the digital-analogue conversion circuit 18 and the low-pass filter 19) connected to the digital-signal-processing circuit 14.

Hereafter, an explanation is given about operation of the digital-signal-processing circuit 14 and the digital-signal-processing camera using a digital-signal-processing LSI as constructed above.

First, FIG. 5 shows an example of construction for the digital-signal-processing camera of the second embodiment which uses the digital-signal processing LSI;

pulses for driving the solid-state image-pickup element are generated by the drive circuit 12 in synchronism with the synchronizing signal which is generated in the synchronizing signal generation circuit 13, thereby operating the solid-state image-pickup element 11. The solid-state image-pickup element 11 issues an output signal in synchronism with the synchronizing signal. Therefore, the output signal of the solid-state image-pickup element 11 and the synchronizing signal are inputted to the digital-signal-processing LSI 16 synchronously with each other. The output signal, which comes from the solid-state image-pickup element 11, is subjected to a signal processing at the digital-signal-processing circuit 14 and is issued through the digital-analogue conversion circuit 18 and the low-pass filter 19 as a picture signal. At that time, the picture signal is delayed (by e.g. approx. 10 μsec) from the synchronizing signal owing to the signal processing, and the synchronizing signal generated by the synchronizing signal generation circuit 13 is delayed by the delay circuit 15 by a delay time (approx. 10 μsec) which is nearly equal to the total delay time of the analogue-signal-processing circuit (the digital-analogue conversion circuit 18 and the low-pass filter 19) connected to the digital-signal-processing circuit 14, and thereby it is issued in a proper timing for the picture signal. After that, this picture signal and the synchronizing signal are inputted to the VTR-processing block 17. Further, when the delay time (e.g. the delay time of the low-pass filter) of the analogue-signal-processing circuit is not constant, a delay time of the delay circuit 15 in the digital signal LSI 16 may be changed by the microcomputer 10, thereby to match delay times of the picture signal and the synchronizing signal with each other.

As has been stated above, it becomes possible to shorten a wire for the synchronizing signal and isolate the synchronizing signal from the analogue-signal-processing circuit, thereby remarkably eliminating a disturbance which is given to the picture signal by the synchronizing signal, by providing the digital-signal-processing camera in this embodiment with: the digital-signal-processing circuit; the analogue-signal-processing circuit connected to the aforementioned digital-signal-processing circuit; and the delay circuit which delays the aforementioned synchronizing signal by a delay time which is nearly equal to the total delay time of the aforementioned digital-signal-processing circuit and the aforementioned analogue-signal processing circuits, and by employing a construction in which the aforementioned delay circuit and the aforementioned digital-signal-processing circuit are mounted in a single LSI. Moreover, the picture signal output of the signal processing circuit and the synchronizing signal can be issued in a proper timing. Further, it is also possible to minimize a circuit-construction. Furthermore, it is possible to change the delay time by the microcomputer 10 and to absorb the delay time of the analogue-signal-processing circuit.

Hereupon, although description was made simply about the synchronizing signal, this means to be directed not only to the synchronizing signal in a narrow sense, but also can be obviously directed to the blanking signal, clamp pulses or a color burst etc. besides the horizontal synchronizing signal and the vertical synchronizing signal.

Moreover, although the time period $T_A$ was defined in the description of the first embodiment, the time period $T_A$ may be zero. At that time, a delay time of the delay circuit is equal to the delay time $T_B$ of the signal processing circuit.

Further, although a delay time of the delay circuit was set a delay time of the time period $(T_B-T_A)$ in the first embodiment, it may be a delay time defined by subtracting the time period $T_A$ from a delay time which can cancel a delay time of the external delay circuit (e.g. the analogue circuit such as the digital-analogue conversion circuit-or the low-pass filter) in view of the whole system.

Moreover, although description was made only about one delay circuit, it is possible to provide plural delay circuits corresponding to a necessary number of the synchronizing signal.

Further, although description was made in this embodiment on such a condition that a process subsequent to the digital-signal-processing apparatus is the VTR-processing block, any other processing blocks of the NTSC encoder etc., in which the picture signal and the synchronizing signal are inputted synchronously with each other, can be similarly applied.

Further, in the second embodiment, description was given by taking a process time of the analogue-signal-processing circuit into account, but in case there is no analogue-signal-processing circuit, only a process time of the digital-signal-processing circuit serves as a delay time of the delay circuit.

INDUSTRIAL APPLICABILITY

As has been stated above, the present invention has a great effect such that the picture signal gets no disturbance and the picture signal output of the signal processing circuit and the synchronizing signal can be issued in a proper timing, by employing a construction having: a synchronizing signal generation circuit for generating a synchronizing signal; a solid-state image-pickup element; a drive circuit for driving the aforementioned solid-state image-pickup element so that an output signal of the aforementioned solid-state image-pickup element is issued prior to an end time of a horizontal blanking period by a time period $T_A$ within the horizontal blanking period; a signal processing circuit for processing an output signal issued from the aforementioned solid-state image-pickup element; and a delay circuit for delaying the aforementioned synchronizing signal by a time period which is subtracted by the aforementioned time period $T_A$ from a delay time $T_B$ of the aforementioned signal processing circuit. Besides, by incorporating the delay circuit in an LSI which constitute a signal processing circuit, there arises a great effect such that a circuit-construction can be minimized and a disturbance to be given to the picture signal by the synchronizing signal is remarkably eliminated.

We claim:

1. A digital-signal-processing camera comprising:
a synchronization circuit for generating a synchronizing signal;
a solid-state image-pickup element;
a drive circuit for driving said solid-state image-pickup element to initiate generation of an output signal at a point in time in a time period $T_A$, said time period $T_A$ being a time period within a horizontal blanking period $T_X$ and occurring prior to an end time of said horizontal blanking period, said time period $T_A$ and horizontal blanking period $T_X$ having the relationship $0<T_A<T_X$;
signal processing means for processing said output signal generated from said solid state image-pick up element and generating a corresponding picture signal having a delay time period $T_B$ such that $T_B > T_X$; and a delay circuit for delaying said synchronizing signal by a time period $T_C$, equal to $T_B - T_A$, said delay circuit and said processing means being provided in a single chip so that disturbances in said picture signal caused by said synchronizing signal are reduced.

2. A digital-signal-processing camera in accordance with claim 1, wherein said signal processing means includes a digital-signal-processing circuit and an analog-signal-processing circuit.

3. A digital-signal-processing camera in accordance with claim 1, wherein said delay circuit and said processing means circuitry are separated on said chip such that said picture signal remains undisturbed by the presence of said synchronizing signal.

* * * * *